US011141723B2

(12) United States Patent
Zhao

(10) Patent No.: US 11,141,723 B2
(45) Date of Patent: Oct. 12, 2021

(54) METHOD FOR IMPROVING CATALYTIC ACTIVITY

(71) Applicant: NewSouth Innovations Pty Limited, Sydney (AU)

(72) Inventor: Chuan Zhao, Randwick (AU)

(73) Assignee: NewSouth Innovations Pty Limited, Sydney (AU)

( * ) Notice: Subject to any disclaimer, the term of this patent is extended or adjusted under 35 U.S.C. 154(b) by 0 days.

(21) Appl. No.: 15/779,007

(22) PCT Filed: Nov. 30, 2016

(86) PCT No.: PCT/AU2016/051178
§ 371 (c)(1),
(2) Date: May 24, 2018

(87) PCT Pub. No.: WO2017/091858
PCT Pub. Date: Jun. 8, 2017

(65) Prior Publication Data
US 2018/0345266 A1  Dec. 6, 2018

(30) Foreign Application Priority Data

Nov. 30, 2015 (AU) ................. 2015904951

(51) Int. Cl.
| | | |
|---|---|---|
| *B01J 37/18* | (2006.01) | |
| *B01J 23/755* | (2006.01) | |
| *B01J 25/02* | (2006.01) | |
| *B01J 35/04* | (2006.01) | |
| *C25B 1/04* | (2021.01) | |
| *B01J 23/74* | (2006.01) | |
| *C25B 11/073* | (2021.01) | |
| *C25B 11/091* | (2021.01) | |
| *B01J 23/745* | (2006.01) | |

(52) U.S. Cl.
CPC ............. *B01J 37/18* (2013.01); *B01J 23/74* (2013.01); *B01J 23/745* (2013.01); *B01J 23/755* (2013.01); *B01J 25/02* (2013.01); *B01J 35/04* (2013.01); *C25B 1/04* (2013.01); *C25B 11/073* (2021.01); *C25B 11/091* (2021.01); *Y02E 60/36* (2013.01)

(58) Field of Classification Search
CPC . B01J 37/18; B01J 23/74; B01J 23/745; B01J 23/755; B01J 25/02; B01J 35/04; C25B 1/04; C25B 11/0442; C25B 11/0478
See application file for complete search history.

(56) References Cited

U.S. PATENT DOCUMENTS

| | | |
|---|---|---|
| 4,132,619 A | 1/1979 | Klein et al. |
| 4,384,928 A | 5/1983 | Hall |
| 2005/0031921 A1 | 2/2005 | Ovshinsky et al. |
| 2014/0294721 A1 | 10/2014 | Feng et al. |
| 2014/0311915 A1 | 10/2014 | Timpano et al. |
| 2015/0292095 A1 | 10/2015 | Haber et al. |
| 2016/0017507 A1* | 1/2016 | Dai .................... C25B 11/0478 204/242 |

FOREIGN PATENT DOCUMENTS

| | | | | |
|---|---|---|---|---|
| CN | 104183830 A | | 12/2014 | |
| CN | 104659357 A | * | 5/2015 | ............. H01M 4/52 |
| CN | 104795493 A | | 7/2015 | |
| CN | 104874389 A | | 9/2015 | |
| CN | 105251489 A | | 1/2016 | |
| JP | 53-059000 A | | 5/1978 | |
| JP | 57-116785 A | | 7/1982 | |
| KR | 20150101776 A | | 9/2015 | |
| WO | 2010/146475 A1 | | 12/2010 | |
| WO | 2017/127945 A | | 8/2017 | |

OTHER PUBLICATIONS

Bao (Ultrathin Spinel-Structured Nanosheets Rich in Oxygen Deficiencies for Enhanced Electrocatalytic Water Oxidation, Angew Chem Int Ed (2015), 54, 7399-7404 first published online in May 2015) (Year: 2015).*
Tan (A Facile and Versatile Method for Preparation of Colored TiO2 with Enhanced Solar-Driven Photocatalytic Activity, Nanoscale, (2014) 6, 10216-10223). (Year: 2014).*
Yang (Efficient Electrocatalytic Oxygen Evolution on Amorphous Nickel-Cobalt Binary Oxide Nanoporous Layers, ACS Nano, (2014), vol. 8, No. 9, pp. 9518-9523). (Year: 2014).*
Zhang (Enhancement of the Field Emission from the TiO2 Nanotube Arrays by Reducing in a NaBH4 Solution, ACS Appl Mater Interfaces (2014), 6, 20625-20633). (Year: 2014).*
Wang et al ("Reduced Mesoporous Co3O4 Nanowires as Efficient Water Oxidation Electrocatalysts and Supercapacitor Electrodes", Adv. Energy Mater. 2014, 1400696, pp. 1-7) (Year: 2014).*
Xu et al (Room-temperature synthetic NiFe layered double hydroxide with different anions intercalation as an excellent oxygen evolution catalyst, RSC Adv. 2015, 5, 55131-55135). (Year: 2015).*
Friebel et al (Identification of Highly Active Fe Sites in (Ni, Fe)OOH for Electrocatalytic Water Splitting, J. Am. Chem. Soc. 2015. 137, 1307-1313) (Year: 2015).*
Shi etal (Structure of the NiFe2O4(001) surface in contact with gaseous O2 and water vapor, Surface Sci 640 (2015) 73-79) (Year: 2015).*
International Search Report from International Application No. PCT/AU2016/051178 dated Feb. 14, 2017.
Chinese Search Report from Chinese Patent Application No. 201680069638.8 dated Jan. 21, 2020.
Supplementary European Search Report for European Application No. 16869410.7 dated Jul. 9, 2019.
Bao et al., "Ultrathin Spinel-Structured Nanosheets Rich in Oxygen Deficiencies for Enhanced Electrocatalytic Water Oxidation", Angewandte Chemie, pp. 51-56.
Trotochaud et al., "Nickel-Iron Oxyhydroxide Oxygen-Evolution Electrocatalysts: The Role of Intentional and Incidental Iron Incorporation", Journal of the American Chemical Society, 2014, 136, pp. 6744-6753.

\* cited by examiner

*Primary Examiner* — Sheng H Davis
*Assistant Examiner* — Michael Forrest
(74) *Attorney, Agent, or Firm* — Greenberg Traurig, LLP

(57) ABSTRACT

The present invention relates to a method for improving the catalytic activity of an oxygen evolution reaction (OER) catalyst comprising a substrate with a catalytic metallic composite coating. The method comprises exposing the metallic composite coating to a reducing agent to thereby increase oxygen vacancy density in the metallic composite coating.

9 Claims, 14 Drawing Sheets

METHOD FOR IMPROVING CATALYTIC ACTIVITY

RELATED APPLICATIONS

This application is a national phase filing under 35 USC 371 of International Application No. PCT/AU2016/051178, filed on Nov. 30, 2016, which claims priority of Australian Patent Application No. 2015904951, filed Nov. 30, 2015, the entirety of which are incorporated herein by reference for all purposes.

TECHNICAL FIELD

The present invention relates to a method for improving the catalytic activity of an oxygen evolution reaction (OER) catalyst comprising a substrate with a catalytic metallic composite coating. It also relates to OER electrodes comprising the improved OER catalysts.

BACKGROUND

Due to the increasing rate of energy demand and pollutant emissions from fossil fuels, there is an intense research interest in energy conversion and storage from alternative sustainable energy sources. Electrochemical and solar water splitting have been considered as one of the important alternatives to produce hydrogen fuels in a large scale on the cathode while oxygen evolution reaction (OER) is taking place on the anode. However, often the kinetics of OER is slow and consequently affects hydrogen evolution reaction (HER) on the cathode.

To increase OER kinetics, a huge amount of work to synthesize efficient catalysts has been done. Whilst iridium dioxide ($IrO_2$) and ruthenium dioxide ($RuO_2$) are the most active OER catalysts currently known, their use is often not commercially viable due to their high cost and non-sustainable sources. The use of alternative OER catalysts on the basis of first-row transition metals and their complexes have been investigated. For example, non-precious-metal catalysts such as nickel-based compounds have been described as OER catalysts in recent years.

Recently, Ni/Fe-based materials as OER catalysts which can afford a high water photolysis efficiency (e.g. 12.3%) via perovskite photovoltaics have been reported. However, the electrocatalytic activity, in terms of overpotential to deliver an acceptable high current density, e.g. 100 $mA \cdot cm^{-2}$, is unsatisfactory.

For a scalable storage of renewable energy resources in the form of hydrogen fuels ($H_2$) via electrochemical water splitting, catalytic materials need to overcome the slow reaction kinetics of the oxygen evolution reaction (OER), which generally requires a large amount of overpotential ($\eta$) to generate $H_2$ at an acceptable rate.

It would be advantageous if at least preferred embodiments of the present invention were to provide a facile and general method to improve the catalytic activity of an OER electrode. It would also be advantageous if at least preferred embodiments of the present invention were to enhance the efficiency of a Ni/Fe-based OER electrode, for example by lowering the overpotential with high current density thereby reducing the input energy cost in water splitting.

SUMMARY OF THE INVENTION

The present inventors have undertaken considerable research and have for the first time demonstrated that by treating an OER catalyst comprising a catalytic metallic composite coating supported on a substrate with a reducing agent, the catalytic activity of the metallic composite coating, and thus the catalytic activity of the OER catalyst, is significantly improved. The method of the invention improves the catalytic activity of the OER catalyst without requiring the use of expensive precious metals, and is achieved through inexpensive processing techniques with readily available equipment. The improved OER catalyst may in turn be used as an OER electrode having similarly improved qualities.

Without wishing to be bound by any particular theory, properties such as enhanced electronic conductivity of the catalyst and lowered adsorption energy of $H_2O$ are believed to play an important role in the observed superior catalytic activity by confining oxygen deficiencies in the synthesized material.

According to a first aspect of the present invention, there is provided a method for improving the catalytic activity of an OER catalyst comprising a substrate with a catalytic metallic composite coating, the method comprising:

(i) exposing the metallic composite coating to a reducing agent, thereby increase oxygen vacancy density in the metallic composite coating.

This is described and supported by the experimental detail outlined below.

The metallic composite coating may be a metallic composite thin film coating.

The metallic composite coating may comprise a bimetallic composite. In this embodiment, the bimetallic composite is typically a bimetallic oxide composite, a bimetallic hydroxide composite or a mixture thereof.

Typically, the bimetallic composite is selected from the group consisting of a nickel-iron composite, a nickel-cobalt composite, a manganese-iron composite, a manganese-cobalt composite, or a manganese-zinc composite. Preferably, the bimetallic composite is a nickel-iron composite, such as a nickel-iron composite comprising a nickel-iron oxide, a nickel-iron hydroxide, or a mixture thereof (e.g. a nickel-iron oxyhydroxide).

In one embodiment, the nickel-iron composite has a formula of $Ni_{2x}Fe_{3y}(OH)_{2x+3y}$, wherein x is a number between about 0.1 and about 2 and y is a number between about 0.1 and about 2. For example, x and y may, independently of each other, be a number between 0.1 and 1.8, 0.1 and 1.5, 0.1 and 1.0, 0.1 and 0.5, 0.2 and 1.8, 0.2 and 1.5, 0.2 and 1.0, 0.2 and 0.5, 0.3 and 1.8, 0.3 and 1.5, 0.3 and 1.0, 0.3 and 0.5, 0.5 and 1.8, 0.5 and 1.5, 0.5 and 1.0, 0.5 and 0.8, 1.0 and 1.8, or 1.0 and 1.5 (such as 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0).

The metallic composite may be porous.

In one embodiment, the metallic composite is amorphous. In this embodiment, the amorphous metallic composite coating may comprise nanosheets, nanoflakes, or a combination thereof.

In a further embodiment, the metallic composite is crystalline.

In one embodiment, the reducing agent is selected from the group consisting of sodium borohydride ($NaBH_4$), hydrazine or hydrogen gas.

In one embodiment, the reducing agent is $NaBH_4$. In this embodiment, the reducing agent is preferably exposed to the metallic composite coating as a solution (i.e. the reducing agent is dissolved in a suitable solvent and contacts the metallic composite coating while in solution), and may be exposed for a period of between 30 sec to 100 min, for example between 10 min to 30 min, for example between 15 min to 25 min. Still further, in this embodiment, the solution may have a temperature of between 10° C. and 50° C., for example between 15° C. and 30° C. A person skilled in the art will appreciate that the time and/or temperature may be varied depending on various parameters (such as, for example, the concentration of the reducing agent, the overall volume of the solvent, the size of the coated object, the surface area of the coating, the metal loading within the coating, the composition of the coating, the thickness of the coating, and the activity of the reducing agent) and will be able to determine appropriate times and/or temperatures and/or concentrations etc. for exposing the metallic composite coating to the reducing agent in order to improve the catalytic activity of the coating.

In an embodiment, the reducing agent is exposed to the metallic composite coating as a gas (i.e. the reducing agent is in a gaseous state when it contacts the coating), and may be exposed for a period of between 30 sec to 100 min, for example, between 10 min to 30 min. Still further, in this embodiment, the gas may have a temperature of between 200° C. and 800° C., for example, between 300° C. and 500° C. In some embodiments, the reducing agent is a substantially pure gas. In other embodiments, the gaseous reducing agent is mixed with other gases (for example, nitrogen, argon or other inert gases) in an amount of from about 1% v/v to about 99% v/v (e.g. 10% to 99%, 50% to 95%, 75% to 95%). A person skilled in the art will appreciate that the time and/or temperature may be varied depending on various parameters (such as, for example, the concentration (% v/v) of the gaseous reducing agent, the overall volume of the reaction vessel, the size of the coated object, the surface area of the coating, the metal loading within the coating, the composition of the coating, the thickness of the coating, and the activity of the reducing agent) and will be able to determine appropriate times and/or temperatures and/or concentrations etc. for exposing the metallic composite coating to the reducing agent in order to improve the catalytic activity of the coating.

Typically, the substrate is an electrically conductive substrate which is preferably porous, for example, a nickel foam (NF).

According to a second aspect of the present invention, there is provided an OER electrode comprising a substrate with a nickel-iron composite coating, wherein the nickel-iron composite has been exposed to a reducing agent, to thereby increase oxygen vacancy density in the nickel-iron composite coating.

In an embodiment according to the second aspect, the reducing agent is typically selected from the group consisting of sodium borohydride ($NaBH_4$), hydrazine and hydrogen gas. In an embodiment, the reducing agent is $NaBH_4$.

In an embodiment according to the second aspect, the substrate is an electrically conductive substrate, which is preferably porous. More preferably still, the porous electrically conductive substrate is a nickel foam.

According to a third aspect of the present invention, there is provided a method for improving the catalytic activity of an OER electrode comprising a substrate with a catalytic nickel-iron (NiFe) composite coating, the method comprising:
  (i) exposing the nickel-iron composite coating to $NaBH_4$, to thereby increase oxygen vacancy density in the metallic composite coating.

BRIEF DESCRIPTION OF THE FIGURES

Preferred embodiments of the present invention are described below, by way of example only, with reference to the accompanying drawings in which.

DEFINITIONS

Figure 1:
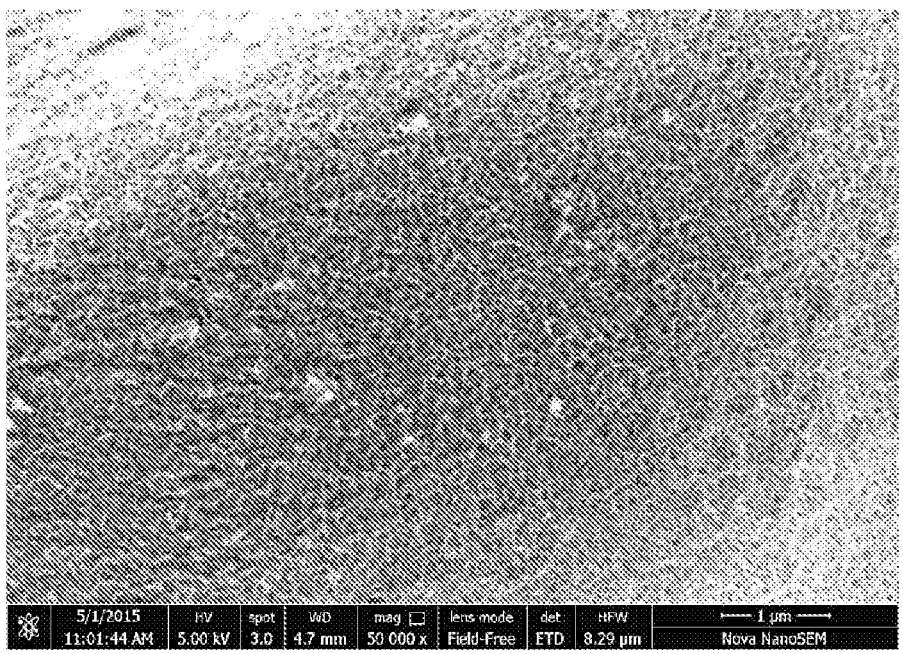
FIGS. 1 (a) and (b) show an SEM image of NiFe/NF before $NaBH_4$ treatment at various magnifications.
Figure 1:
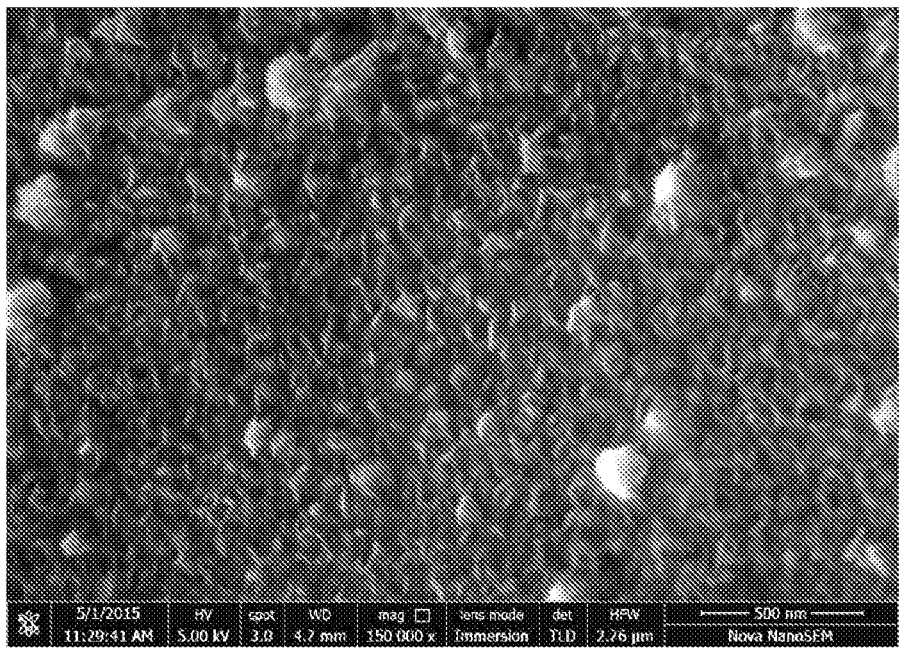

As used herein, the following terms are considered to have the following meanings:

"metallic composite": a composite material comprising a metal and at least one other element, where the at least one other element may or may not be a metal.

"metallic oxide composite": a metallic composite material comprising at least one metal oxide.

"metallic hydroxide composite": a metallic composite material comprising at least one metal hydroxide.

"oxyhydroxide": a mixed oxide and hydroxide (i.e. a material comprising at least one metal oxide and at least one metal hydroxide).

"nanosheet": a sheet-like structure having a substantially planar type three dimensional structure having a substantially constant width of less than about 100 nm (e.g. less than about 80, 50, 40, 30, 20, 10, 5 nm) in one dimension, and extending from several nanometers to several hundred nanometers in each other dimension.

"nanoflake": a flake-like three dimensional structure, extending from several nanometers (e.g. 2, 5, 10, 20 nm) to several hundred nanometers (e.g. 200, 300, 400, 500, 600, 700 nm) in each dimension.

DETAILED DESCRIPTION

The inventors have found a method that can be used to improve the catalytic activity of an OER catalyst. The improved OER catalyst prepared by the method of the invention may be used as an OER electrode having improved efficiency towards OER.

In a first aspect, the present invention provides a method for improving the catalytic activity of an OER catalyst. The OER catalyst comprises a substrate with a catalytic metallic composite coating. The method comprises a step of exposing the metallic composite coating to a reducing agent. In this way, oxygen vacancy density in the metallic composite coating is increased relative to the metallic composite coating which has not been exposed to a reducing agent.

The catalytic metallic composite is a composite material having catalytic activity in the OER and comprising a metal and at least one other element, where the at least one other element may or may not be a metal. The composite is also capable of having an increased oxygen vacancy density as a result of exposure to the reducing agent. The oxygen vacancy density is the number of oxygen vacancies per unit volume. The increase in oxygen vacancy density may be from a zero or non-zero oxygen vacancy density in the material prior to the exposure to the reducing agent. In other words, the material prior to exposure to the reducing agent may have no oxygen vacancy density or may have some oxygen vacancy density. As discussed in more detail below, an oxygen vacancy is generated by an oxygen atom being removed from the material. In this way, an oxygen vacancy may be generated or formed from metallic composite materials such as metallic oxide composite materials, metallic hydroxide composite materials, metallic oxyhydroxide composite materials (i.e. materials comprising a mixture of metallic oxide and metallic hydroxide composite materials) and mixtures thereof. As a person skilled in the art will appreciate, the metallic composite material may be any metallic composite material which, at least prior to exposure to the reducing agent, comprises oxygen atoms. The oxygen atoms may be present in the material in any form (e.g as a metal hydroxide or a metal oxide). As a person skilled in the art will also appreciate, the oxygen atoms may be completely or partially removed in forming or introducing the oxygen vacancy (e.g. exposing the metallic composite material to the reducing agent may remove all of the oxygen atoms previously present in the metallic composite material, or may remove only a portion of the number of oxygen atoms from the metallic composite material, leaving some oxygen atoms remaining). In some embodiments, the metallic composite material may already contain oxygen vacancies. In such embodiments, exposing the metallic composite material (containing oxygen vacancies and oxygen atoms) to the reducing agent will increase the number of oxygen vacancies, thereby increasing the overall oxygen vacancy density of the material. In other embodiments, exposing the metallic composite material (containing oxygen atoms and no oxygen vacancies) to the reducing agent will form oxygen vacancies, thereby increasing the number of oxygen vacancies and the oxygen vacancy density of the material.

The method of the invention relates to a method for improving the catalytic activity of an OER catalyst. As used herein, "OER" refers to the oxygen evolution reaction; an anodic reaction that accompanies, in aqueous electrolytes, cathodic processes such as metal electrowinning and hydrogen production via water electrolysis. As mentioned previously, for the latter process, the anodic overpotential is recognised as a major factor in limiting operational efficiency.

The improved OER catalyst is particularly suited for use under alkaline electrolyte conditions. Under certain acidic conditions, etching of the catalytic metallic composite coating and the substrate under applied potential may occur.

Water oxidation is one of the half reactions of water splitting. When using, for example, a nickel-iron catalyst, under alkaline electrolyte conditions, the following reactions are relevant:

$$4OH^- \rightarrow 2H_2O + 4e^- + O_2 \text{ Oxidation (in alkaline electrolyte)} \tag{1}$$

$$4e^- + 4H_2O \rightarrow 4OH^- + 2H_2 \text{ Reduction} \tag{2}$$

$$2H_2O \rightarrow 2H_2 + O_2 \text{ Total Reaction} \tag{3}$$

Of the two half reactions, the oxidation step is typically the most demanding because it requires the coupling of 4 electron and proton transfers and the formation of an oxygen-oxygen bond. Since hydrogen can be used as an alternative clean burning fuel, there exists a need to split water efficiently. There are known materials that can mediate the reduction step efficiently; therefore much of the current research is aimed at the oxidation half reaction, also known as the Oxygen Evolution Reaction (OER; i.e. Equation 1 above). An OER catalyst is one which catalyses the OER, i.e. exhibits catalytic activity towards the process of Equation 1.

As used herein the term "OER electrode" refers to an electrode which exhibits high activity for the OER.

The OER catalyst is comprised of a substrate with a catalytic metallic composite coating.

In theory, any substrate which is capable of supporting a catalytic metallic composite coating may be used. In the examples provided herein, the catalytic metallic composite coatings have a certain affinity to the supporting substrates, thereby avoiding the usage of chemical binders. However, the method of the present invention may also be applied to improve the catalytic performance of catalysts which employ chemical binders (which are generally polymeric in nature) to maintain the catalytic metallic composite coating on the substrate.

The catalytic metallic composite is in the form of a coating. The catalytic metallic composite "coats" the substrate. By this is meant that a surface of the substrate is in contact with a surface of the catalytic metallic composite. As described herein, the composite may be directly in contact with the substrate or may be in contact with the substrate in an indirect manner such as, for example, by way of a binder. The coating is typically a layer on the surface of the substrate and may be of any thickness that is capable of performing in the method of the invention. The coating may be a complete or a partial coating. In other words, the coating may completely coat the substrate (i.e. completely coat or cover the substrate), or may be a partial coating (i.e. coat or cover a portion of the substrate). Typically, the coating will cover at least a portion, preferably a substantial portion (or the entire portion), of the substrate that is or will be exposed to the electrolyte/solution when the catalyst is used.

The present inventors have recently demonstrated in International Patent Application No. PCT/AU2015/000478 that amorphous porous metallic composites supported on the surfaces of three dimensional interpenetrating porous substrates (wherein the average pore diameter of the substrate being sufficiently larger than that of the metallic composite) can be used as efficient catalysts towards OER, HER and in other catalytic applications.

The method of the present invention is suitable for improving the catalytic activity of OER catalysts having a metal foam as a substrate. A metal foam (e.g. nickel foam) has a cellular structure consisting of a solid metal with gas-filled pores (voids) comprising a portion of the volume. The pores can be sealed (closed-cell foam) or interconnected (open-cell foam). Preferably, the nickel foam is an open-cell foam. A defining characteristic of metal foams is a high porosity: typically only 5-25% of the volume is the base metal, making these materials ultralight with a high surface area. Metal foams, including nickel foams, can be purchased from commercial suppliers having various properties (e.g. various porosities, pore volumes, thickness, alloy compositions or densities).

The method of the present invention is particularly suitable for improving the catalytic activity of OER catalysts having substrates as described in International Patent Application No. PCT/AU2015/000478, i.e. metal foams. An advantage of using metal foams (such as, for example, a nickel foam as described in PCT/AU2015/000478), is that such foams may be an electrically conductive porous material which is relatively inert and does not significantly deteriorate in aqueous solution. Furthermore, various metal foams are commercially available and may be relatively inexpensive. A further advantage of metal foams is that they are robust, and where weight considerations are a factor for the final use of the catalytic assembly, they provide excellent weight efficiency.

Examples of substrates described herein include nickel foam (NF) and carbon nanotubes (CNT).

A metallic composite coating has a certain catalytic activity towards OER, the efficiency of which is improved using the method of the invention. In the examples provided herein, the catalytic metallic composite coatings are deposited using either the electrodeposition process described in International Patent Application No. PCT/AU2015/000478, or known methods for depositing or growing metallic composites onto CNT, or by using hydrothermally growing techniques. However, the method of the present invention may also be applied to improve the catalytic performance of those catalytic metallic composite coatings towards OER deposited using other techniques, such as annealing, chemical vapour deposition or sol-gel deposition.

The method comprises a step of exposing the metallic composite coating to a reducing agent. A reducing agent is an element or compound that donates an electron to another chemical species in a redox chemical reaction. The reducing agent described in the examples is sodium borohydride ($NaBH_4$). $NaBH_4$ is a common and readily available reducing agent. However, other reducing agents (e.g. $NaCNBH_3$, $NaBH(OAc)_3$, $LiAlH_4$, $LiBH_4$, $LiEt_3BH$, diisobutylaluminium hydride, borane and borane adducts such as $BH_3.THF$) may also be used in the method of the present invention. The metallic composite coating is exposed to the reducing agent. That is, the reducing agent is introduced to the metallic composite coating in such a manner so as to allow it to come into contact with the metallic composite coating (e.g. submerging, or at least partially immersing, the metallic composite into a solution comprising the reducing agent or pouring or spraying a solution comprising the reducing agent onto the metallic composite). In some embodiments, the metallic composite is in the form of a coating on the substrate when exposed to the reducing agent. In other embodiments, the metallic composite is exposed to the reducing agent and later formed into a metallic coating on the substrate. Upon coming into contact (i.e. upon exposure), the metallic composite coating is subsequently reduced by the reducing agent.

It is an essential feature of the method of the invention that the oxygen vacancy density in the metallic composite coating is increased upon exposure to the reducing agent. In other words, reduction of the metallic composite coating by the reducing agent increases oxygen vacancy density in the metallic composite coating.

Oxygen vacancy refers to a defect in which an oxygen atom is removed from the lattice, leaving a vacancy behind with two electrons. It should be noted that oxygen vacancy (as the dominating defect) will only take place in materials (e.g. oxides/hydroxides) where the material is reduced by the reducing agent. Increasing the oxygen vacancy density of the metallic composite coating means increasing the number (or concentration) of oxygen vacancies in the metallic composite coating per unit area. Without wishing to be bound by any particular theory, the inventors believe that by reducing the metallic cations in the composite coating using a reducing agent, oxygen vacancies are introduced, which may be confined on the surface or in the interior of the metallic composite coating. The increase in oxygen vacancy density (caused by reducing the metallic composite coating) enhances the electrical conductivity as well as charge transportation of the metallic composite coating. In this way, the catalytic activity of an OER catalyst is improved, and, in preferred embodiments, is significantly improved.

The metallic composite coating may be a metallic composite thin film coating. The term "thin film" as used herein is taken to mean a film (i.e. a material in a planar/sheet-like form) having an average thickness of less than approximately 1 micron (e.g. <0.9 µm, <0.75 µm, <0.5 µm, <0.25 µm, <0.2 µm or <0.1 µm).

The metallic composite coating may comprise a bimetallic composite, such as, for example, is a bimetallic oxide composite, a bimetallic hydroxide composite or a mixture thereof (an oxyhydroxide).

The metallic composite is provided as a coating on a substrate, with or without a binder therebetween. The composite may be a bimetallic composite. The bimetallic composite may be selected from the group consisting of a nickel-iron composite, a nickel-cobalt composite, a manganese-iron composite, a manganese-cobalt composite, or a manganese-zinc composite. The method of the present invention may be used on various catalytic metallic oxide systems wherein the metal ions can be reduced to a lower oxidation state upon exposure to a suitable reducing agent, thereby creating oxygen vacancies.

Surprisingly, the inventors have found that when a bimetallic composite coating is used, exposure of the bimetallic composite coating to the reducing agent increases oxygen vacancy density in the bimetallic composite coating significantly more than when each of the individual metallic coatings are exposed to the reducing agent under identical conditions. Without wishing to be bound by theory, the inventors believe that there is a synergetic effect of the metals (in the bimetallic composite) on the catalyst structure which provides particularly good performance in the OER catalyst after the reduction treatment (i.e. after exposing the metallic composite to the reducing agent).

According to experiments conducted by the inventors, although Ni/NF and Fe/NF after reduction show improved OER performance, the reduced NiFe/NF is more efficient than the reduced individual metal hydroxides.

In one example, the bimetallic composite is a NiFe oxyhydroxide composite which is electrodeposited on a NF substrate according to the method described in International Patent Application No. PCT/AU2015/000478. NiFe is known to exhibit catalytic activity towards OER. The NiFe oxyhydroxide composite is typically provided as an amorphous porous coating comprised of nanosheets. That is, in one embodiment, the metallic composite is amorphous which means that it is a solid that does not have an ordered structure such as the ordered structure of a crystalline material. The NiFe/NF has a hierarchical porous structure as which is advantageous to its use as an OER catalyst for the reasons discussed in International Patent Application No. PCT/AU2015/000478.

In the examples provided, the reducing agent is provided as a solution (i.e. a solution comprising a reducing agent and a suitable solvent). However, the reducing agent may also be provided in a gaseous form. This may have particular advantages for particular applications, for example, when the reducing agent is not readily soluble, or when the pore size of a porous metallic composite coating and/or substrate is particularly small. It is envisaged that, in this scenario, exposing the reducing agent as a gas would allow higher diffusivity of the reducing agent into the metallic composite coating.

As a person skilled in the art will appreciate, the metallic composite coating will preferably be exposed to the reducing agent for an optimal period of time to produce an optimal increase in oxygen vacancy density. For example, when the reducing agent is provided as a solution of $NaBH_4$ to a catalytic bimetallic composite, the optimal time period may be, for example, between 30 seconds to 100 minutes, for example between 10 min to 30 min, for example between 15 minutes and 25 minutes. Similarly, using the same example, the temperature of the solution may need to be optimised. In the examples described herein, the optimal temperature of the solution may be between 10° C. and 50° C., for example between 15° C. and 30° C. When the reducing agent is provided as a gas, the optimal time period may be, for example, between 30 seconds to 100 minutes, for example between 10 minutes and 30 minutes. Similarly, using the same example, the temperature of the gas may need to be optimised. For example, the optimal temperature of the gas may be between 200° C. and 800° C., preferably between 300° C. and 500° C. The gas may also be "diluted" by including a further suitable gas (e.g. a mixture of the gaseous reducing agent and a suitable, preferably inert, gas such as nitrogen or argon). A person skilled in the art will be able to select the temperature of the solution or gas and length of time of the exposure of the composite coating to the reducing agent so as to be effective and to effectively, and optimally, increase the density of oxygen vacancy in the metallic composite coating. Other factors such as concentration of the reducing agent solution/mixture, agitation, addition rates, pressures, etc. may also need to be optimised.

The substrate may be an electrically conducting substrate. The electrically conducting substrate may be porous, such as, for example NF.

The method of the invention is particularly suitable to improving the catalytic activity of, and thus the effectiveness of, bimetallic OER catalytic assemblies, such as those described in International Patent Application No. PCT/AU2015/000478. The method of the invention is particularly suitable to improve the catalytic activity of catalytic assemblies described in International Patent Application No. PCT/AU2015/000478 where the porous metallic composite is an electrodeposited NiFe composite on a NF substrate.

In another aspect, the present invention provides an OER electrode comprising a substrate with a nickel-iron composite coating, wherein the nickel-iron composite has been exposed to a reducing agent, to thereby increase oxygen vacancy density in the nickel-iron composite coating.

In yet another aspect, the present invention provides method for improving the catalytic activity of an OER electrode comprising a substrate with a catalytic nickel-iron composite coating, the method comprising:
(i) exposing the nickel-iron composite coating to $NaBH_4$, to thereby increase oxygen vacancy density in the metallic composite coating.

EXAMPLES

Various embodiments of the present invention are described with reference to the following examples.

Materials and Method

Preparation of R—NiFe/NF Electrode and Characterization

The reduced NiFe/NF (denoted R—NiFe/NF) nanosheets with rich oxygen deficiencies were prepared via a two-step process. A thin NiFe hydroxide sheet with yellow color covered the nickel foam was firstly electrodeposited onto the nickel foam (NF) by the electrodeposition process recently described in our earlier International Patent Application No. PCT/AU2015/000478. The contents of PCT/AU2015/000478 is incorporated herein by reference. By using the method described in International Patent Application No. PCT/AU2015/000478, the NiFe-hydroxide was vertically deposited onto the NF substrate with open area between nanosheet-like structures (refer FIG. 1). Subsequently, a facile and economical chemical treatment was conducted by immersing the NiFe/NF electrode into a 1 M $NaBH_4$ solution for 20 minutes at room temperature, followed by washing with deionized water. Further details are given below.

Synthesis of NiFe/NF Electrode and Characterization

Nickel foam (purchased from Goodfellow, UK, 95% purity and 95% porosity) was sonicated in 5 M HCl for 30 minutes to remove nickel oxide layer and then rinsed with water and ethanol several times and left to dry in air. Ni—Fe electrodeposition was carried out by electrodeposition at 10° C. Co-deposition of Ni and Fe was done with one electrolyte containing both metallic sources. Nitrate salt of Ni and Fe was used to make the electrodeposition electrolyte. To achieve a Ni—Fe alloy, 3 mM $Ni(NO_3)_2$ and 3 mM $Fe(NO_3)_3$ were dissolved in water without any additive. Ni/NF and Fe/NF was fabricated by electrodeposition of each metal from solution 6 mM of individual metal source. By applying electrical potential and according to Equation 4 nitrate ion reacts with water and produces hydroxide ions. The generated hydroxide ions then reacts with Ni and Fe ions in the electrolyte (Equation 5) and bimetallic hydroxide forms on the surface of electrodes.

$$NO_3^- + 7H_2O + 8e^- \rightarrow NH_4^+ + 10OH^- \quad (4)$$

$$xNi^{2+} + yFe^{3+} + (2x+3y)OH^- \rightarrow Ni_{2x}Fe_{3y}OH_{(2x+3y)} \quad (5)$$

After Ni—Fe electrodeposition, the electrode is washed and immersed in 1 M NaBH$_4$ solution for 20 minutes at room temperature. The electrode is then rinsed with water.

NaBH$_4$ reduction mechanism can be explained by providing free electron in basic and neutral media according to Equation 6:

$$BH_4^- + 8OH^- \rightarrow B(OH)_4^- + 4H_2O + 8e^- \quad (6)$$

The electrochemical surface area (ECSA) of each electrocatalyst is determined by double layer capacitance ($C_{DL}$) according to Equation 7:

$$ECSA = C_{DL}/C_S \quad (7)$$

where $C_S$ is the specific capacitance of the sample of an atomically smooth planar surface of the material per unit area. Specific capacitances have been measured for a variety of metal electrodes in acidic and alkaline solutions and typical values reported range between $C_S = 0.022$-$0.130$ mF cm$^{-2}$ in NaOH and KOH solutions. In this study, $C_S = 0.04$ in 1 M KOH was used for estimation of ECSA. $C_{DL}$ is calculated from absolute average of slopes of lines in the plot of currents versus scan rates. In order to measure the currents (I), open circuit potential (OCP) was measured in the solution and then CV in a window potential of OCP±0.05 V at different scan rates was recorded. The anodic and cathodic currents in FIG. 12a were used to plot FIG. 12b.

Electrochemical Evaluation

The electrochemical experiments were performed under normal bench-top laboratory condition with a CH760 Electrochemical Workstation (CH Instrument, Texas, USA) using a three-electrode cell arrangement. Ag/AgCl electrode with 1 M KCl solution and Pt wire were used as the reference and counter electrode. CVs and LSVs measurement were performed with the scan rate of 5 mV·s$^{-1}$. Tafel slope determination was measured with the scan rate of 0.1 mV·s$^{-1}$. The electrochemical impedance spectroscopy (EIS) test was performed by B.A.S. potentiostat in a frequency range of 100 kHz to 0.01 Hz. All current densities in this specification were calculated by using the geometric surface area of the working electrode.

Turnover frequency (TOF) at overpotential of 400 mV was determined by EQCM measurements and following Equation 8:

$$TOF = J/4Fn \quad (8)$$

Where J is current density at η=400 mV in A·cm$^{-2}$, F is the Faraday constant (96485 mol$^{-1}$) and n is the number of mole of catalyst electrodeposited onto GC surface disk which was obtained by EQCM. For evaluating Faradic efficiency, polarization curves from ring rotating disk electrode (RRDE) have been plotted and the Faradic efficiency (ε) was calculated based on Equation 9:

$$\varepsilon = I_R/I_D \cdot N \quad (9)$$

where N is collection efficiency of the ring and $I_R$ and $I_D$ are current obtained on the Pt ring and glassy carbon disc, respectively. A potential of 0.5 V (vs. RHE) was applied for ring to reduce the generated oxygen on the disk surface.

Materials Characterization

For characterization of the materials, SEM was used for morphology studying by FEI Nova FESEM JEOL 7001F. XPS was performed on a Thermo ESCALAB250i X-ray Photoelectron Spectrometer. XRD was done on a PANalyticalX'Pert instrument and TEM performed using a Philips CM 200 microscope. Raman was carried out by Renishaw inVia Raman Microscope (510 nm). EPR was done by Bruker EMX X-Band EPR Spectrometer for NiFe/Cu samples since nickel has ferromagnetic properties and cannot be used as substrate.

Synthesis of (i) CNT Supported Ni—Fe Hydroxide and (ii) Hydrothermally Synthesized NiFe/NF Electrode Ni—Fe Layered Double Hydroxide (NiFe-LDH) with carbon nanotube (CNT) support was synthesized by sonication of mildly oxidized multi-wall CNT and DMF and the mixing with Ni(NO$_3$)$_2$ and Fe(NO$_3$)$_3$ at 85° C. for 4 hours. Then more water and DMF was added to solution and the obtained solution was autoclaved for 12 hours at 120° C. followed by 2 more hours at 160° C. Afterwards, the product was collected by filter.

Hydrothermally synthesized NiFe/NF also was made using the autoclave for 12 hours at 120° C. and then a 6 hour drying step at 80° C. For the hydrothermal synthesis, a nickel foam was inserted into the Teflon tube of the autoclave with a solution containing Ni(NO$_3$)$_2$, Fe(NO$_3$)$_3$ and urea.

Results and Discussion

Figure 2:
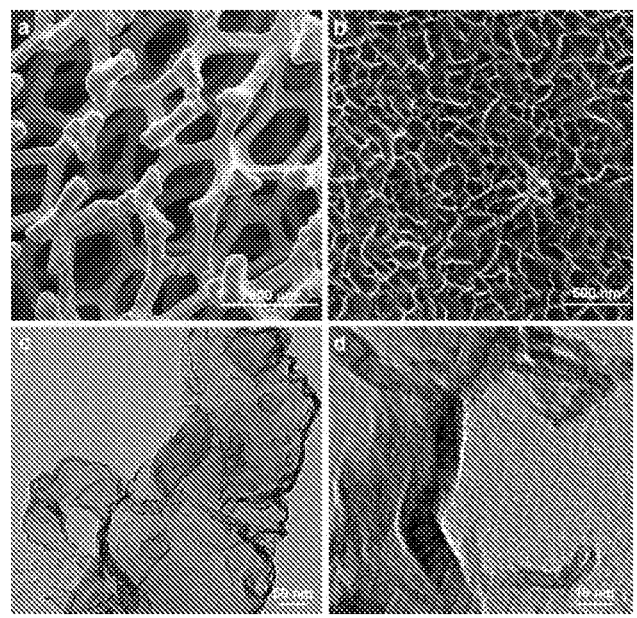
FIG. 2 shows synthesized reduced NiFe/NF (denoted R—NiFe/NF) electrode after $NaBH_4$ treatment using SEM (a,b) and TEM (c,d).

It was noted that the color and appearance of the R—NiFe/NF electrode which was prepared according to PCT/AU2015/000478 showed no detectable change by visual inspection after chemical reduction. The hierarchy morphology of the sample (FIG. 2a), which can boost an electrocatalyst performance by exposing more catalytically active sites and facilitate fast diffusion of active species and charge transport pathways during the electrolysis, remains intact as well, implying a rigid structure of the sample. Additionally, rippled nanosheets forming mesoporous Ni—Fe composite film provide more surface area which it will be preserved during NaBH$_4$ treatment, as displayed in FIG. 2b.

Figure 3:
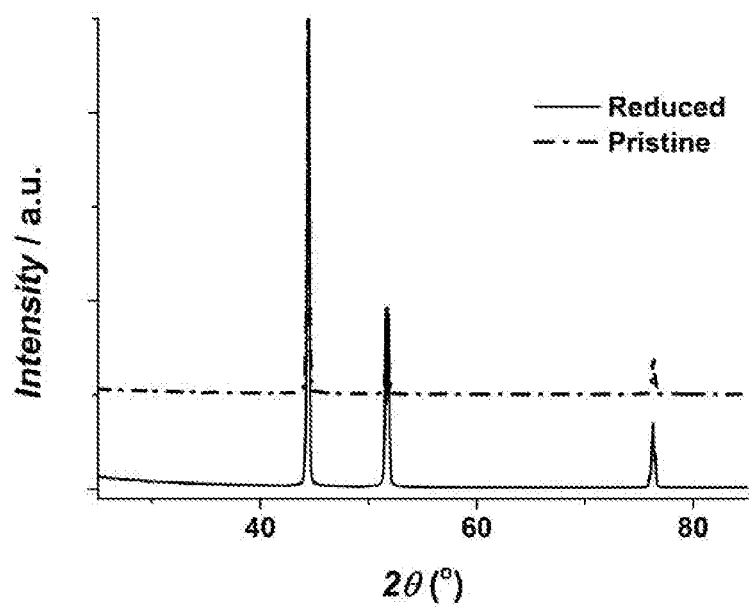
FIG. 3 show the XRD pattern of pristine (NiFe/NF) and reduced (R—NiFe/NF) electrode.
Figure 4:
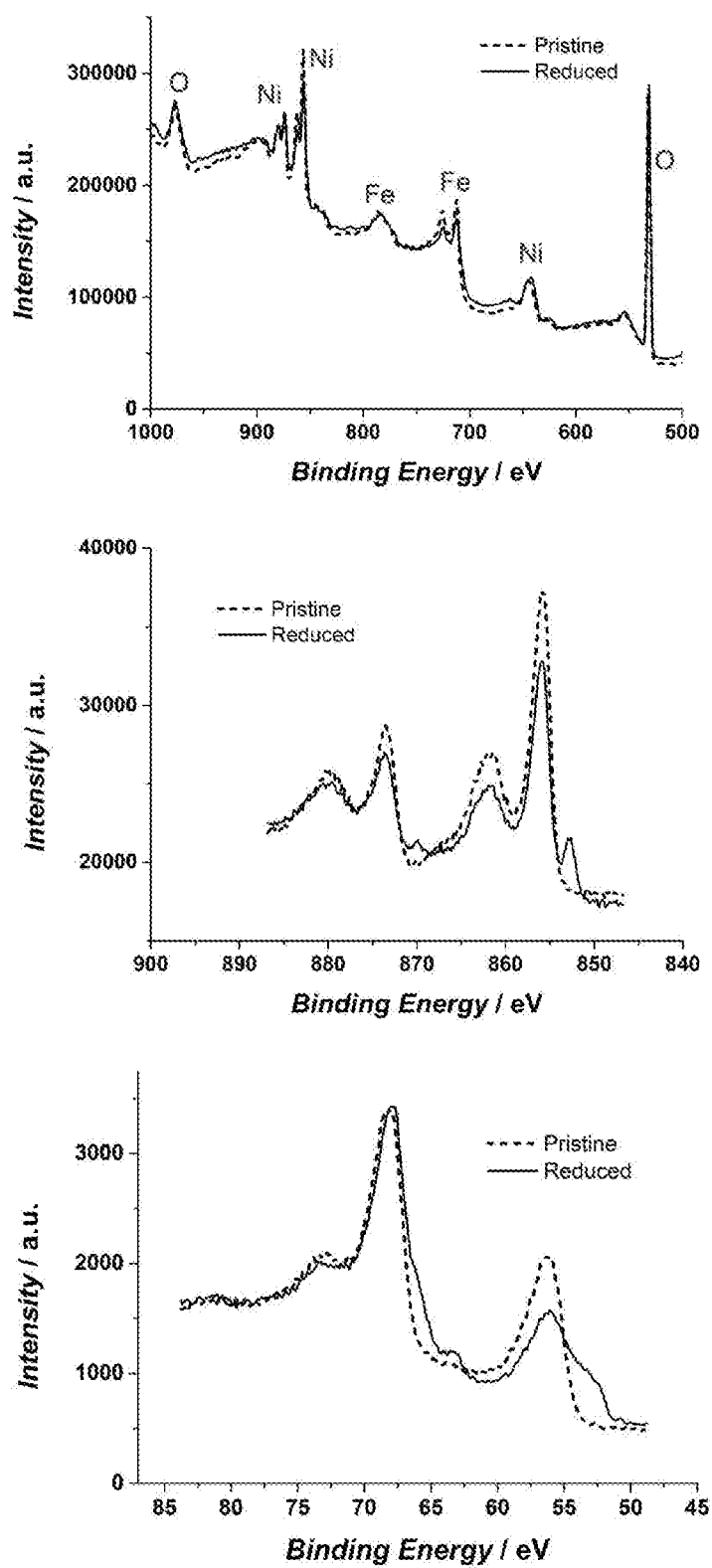
FIG. 4 shows XPS spectra of the NiFe composites before and after $NaBH_4$ treatment. a) XPS survey, b) High resolution XPS spectra of Ni 2p, c) High resolution XPS spectra of Ni 3p and Fe 3p, d) High resolution XPS spectra of Fe 2p, and e) High resolution XPS spectra of O 1 s of NiFe composite before $NaBH_4$ treatment.
Figure 5:
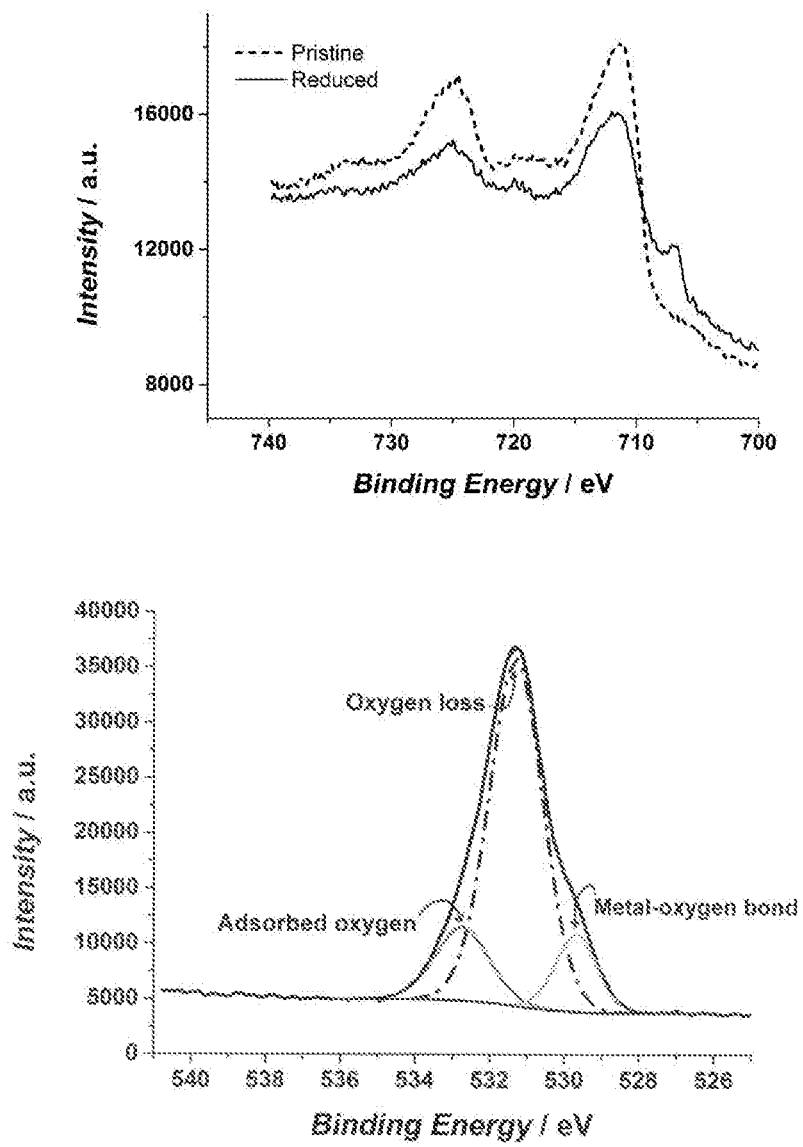
FIG. 5 shows XPS spectra of the NiFe composites before and after $NaBH_4$ treatment. a) High resolution XPS spectra of Fe 2p, and b) High resolution XPS spectra of O 1 s, of NiFe composite before $NaBH_4$ treatment.

X-ray diffraction (XRD) patterns of NiFe/NF and R—NiFe/NF electrodes show no other peaks apart from metallic nickel, suggesting that the materials deposited and after NaBH$_4$ reduction are both amorphous (FIG. 3). This was further confirmed by high-resolution transmission electron micros-copy (HRTEM) where no typical lattice fringes corresponding to Ni, Fe or NiFe composites were detected in FIG. 2c and FIG. 2d. Oxygen vacancy (OV) has been reported to play an important role in both photocatalysts and electrocatalysts towards water oxidation. X-ray photoelectron spectroscopy (XPS) measurements were taken to gain insight into the Ni and Fe chemical state in the pristine and reduced samples (FIG. 4a), certifying the presence of more oxygen vacancies in the R—NiFe/NF nanosheets. In the Ni 2p (FIG. 4b) and Ni3p (FIG. 4c) spectrums of pristine NiFe/NF, the Ni 2p$_{1/2}$ at 855.8 eV belongs to Ni(OH)$_2$, while peaks at 68.2 and 71.3 eV are attributed to Ni$^{2+}$3p$_{1/2}$ and Ni$^{3+}$3p$_{3/2}$, respectively, revealing the coexistence of Ni$^{2+}$/Ni$^{3+}$ states suggesting the NiOOH phase. The Fe 2p spectrum (FIG. 5a) displays two major peaks at 724.78 and 711.58 eV with an obvious Fe 2p$_{3/2}$ associated satellite peak at around 719.0 eV, indicating the iron atoms in the pristine samples are presented as Fe$^{3+}$ cations in phase of FeOOH. Compared to the pristine sample, new peaks in Ni 2p (853.3 eV) and Fe 2p (707.6 eV) spectrums corresponding to metallic Ni and Fe, respectively, and a new broad shoulder in the Fe 3p spectrum (FIG. 4c) which is attributed to $Fe^{2+}$ were observed in the R—NiFe/NF sample.

Moreover, there is a small shift toward lower binding energies after $NaBH_4$ treatment for both Ni and Fe (See FIG. 4a-c and FIG. 5a) suggesting a decrease in the positive charge of the transition metals. All of these results suggest that both nickel and iron were partially reduced to a lower oxidation state by the $NaBH_4$ treatment, with no effect on the body structure of the catalyst, thus forming new oxygen vacancies.

Figure 6:
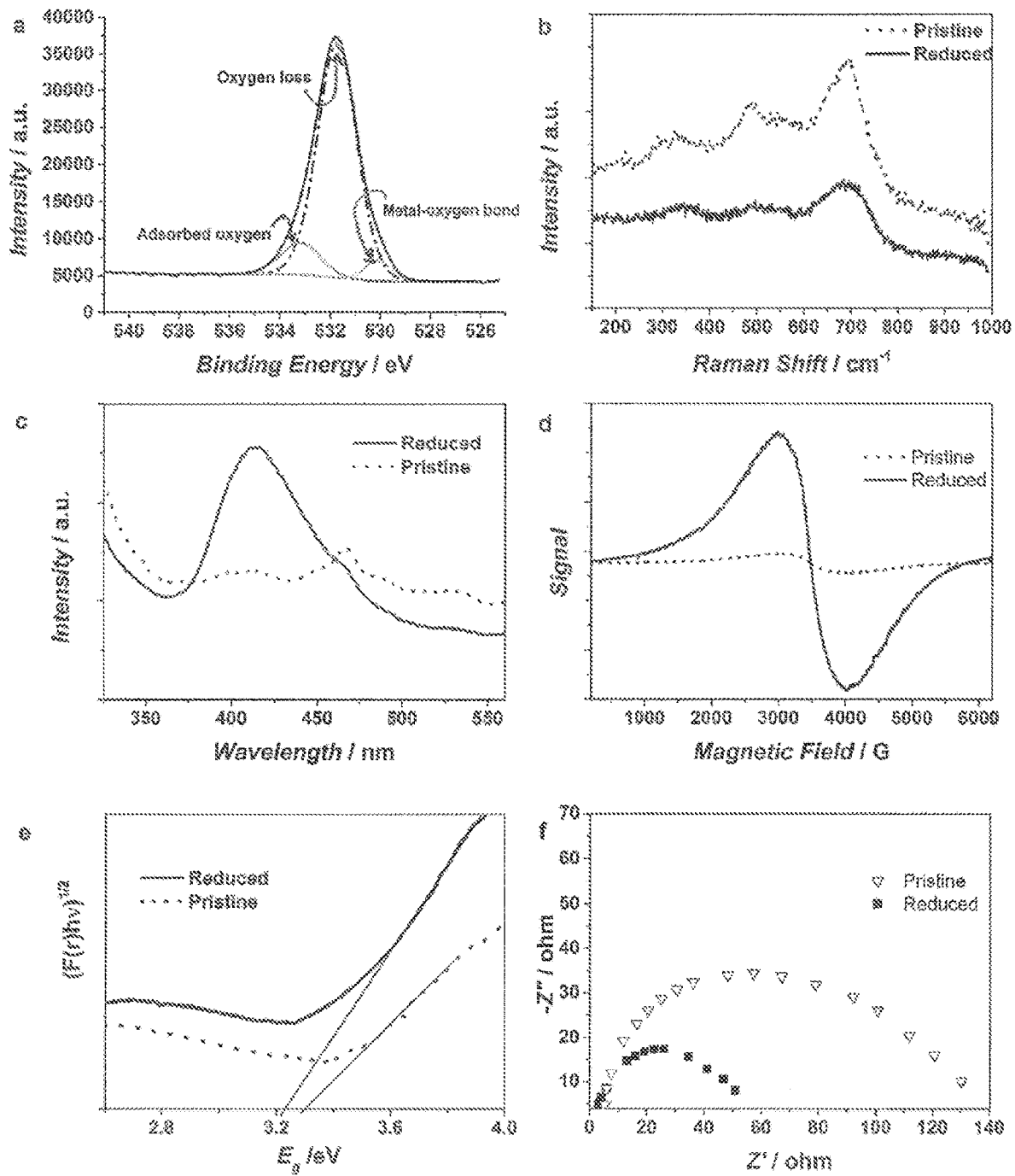
FIG. 6 shows at a) high resolution O 1 s XPS spectrum of NiFe—OOH after reduction treatment, at b-f) further characterization of NiFe—OOH before and after $NaBH_4$ treatment; b) Raman Spectra, c) PL spectra, d) EPR spectra, e) band-gap energy determination via UV-VIS spectroscopy and f) EIS response.
Figure 7:
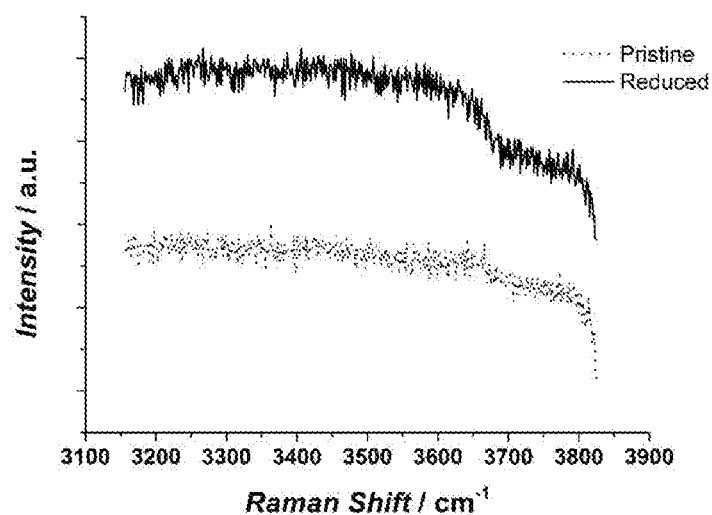
FIG. 7 shows Raman spectra at high wave numbers of Ni—Fe hydroxide films.

The oxygen status in the NiFe (oxy)hydroxide before and after reduction was examined in the O 1s core level spectra. As shown in FIG. 6a, there are three spin-orbit peaks including oxygen-metal bond in the lattice with lower binding energy (530.1 eV), oxygen loss with low oxygen coordination in the material at medium binding energy (531.7 eV) and adsorbed oxygen on and within the surface with higher binding energy (533.2 eV). The OV density formed can be estimated by taking the area of the peak ratio of oxygen loss to lattice oxygen. From FIG. 6a and FIG. 5b, the OV density in the R—NiFe/NF electrode is 7.0, which is almost doubled compared with that of 3.2 in the pristine electrode. Moreover, the increased densities of defects were also confirmed from Raman scattering spectra where weaker and broadened peaks were observed after reduction. The Raman spectra of pristine and R—NiFe/NF electrode are shown in FIG. 6b, is consistent with the presence of FeOOH at 310 and 710 $cm^{-1}$, NiOOH at 550 $cm^{-1}$ and nickel hydroxide at ca. 480 $cm^{-1}$. Moreover, a shoulder at ca. 3640 $cm^{-1}$ (FIG. 7) is due to disordered nickel hydroxide, in which the shoulder is more visible in reduced sample rather than pristine one.

This result could be further validated by photoluminescence (PL) spectroscopy shown in FIG. 6c, as the R—NiFe/NF sample displays a strong PL emission peak at c.a. 410 nm which corresponds to the recombination of holes with two-electron-trapped OV. In addition, electron paramagnetic resonance (EPR) spectroscopy, FIG. 6d, reasserts that the reduced R—NiFe oxyhydroxide has more defects in the structure and the signals at g=1.99 present that the structural defects come from oxygen vacancies.

Figure 8:
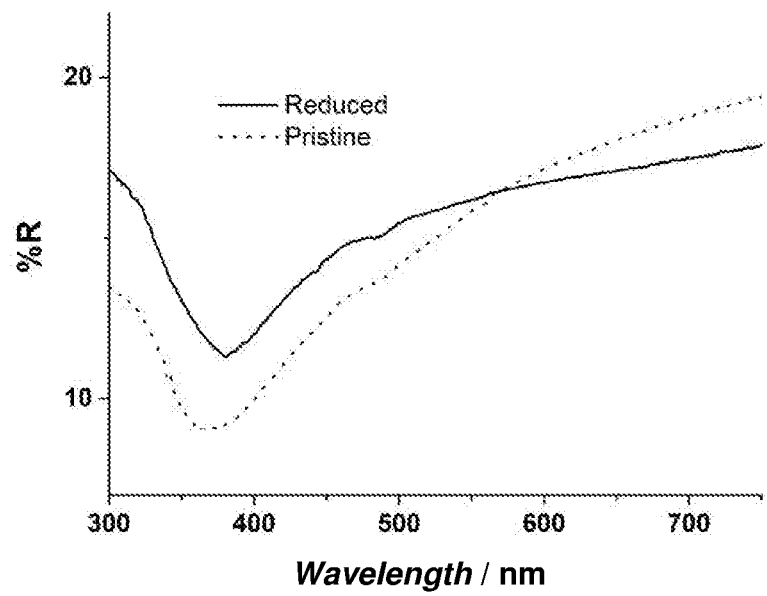
FIG. 8 shows UV-VIS diffuse reflectance spectra of pristine and reduced NiFe—OOH thin films.

In order to investigate the effect of sodium borohydride treatment on electrical properties of NiFe—OOH, UV-VIS spectroscopy was utilized. Based on FIG. 8, the pristine NiFe oxyhydroxide depicts a reflection cut-off edge at about 380 nm while it occurs at about 360 nm for the reduced NiFe oxyhydroxide. Although the general behavior of pristine and reduced NiFe composite layer to UV seems similar with close cut-off edges, the reflectance intensity and accordingly the band gap energy ($E_g$) presented some differences between them. The $E_g$ values calculated with the Tauc method give different values for n=2, indirect transition for NiFe composite. The obtained values of $E_g$ for pristine NiFe composite deposit is 2.9 eV while it is 2.2 eV for reduced one (see FIG. 6e). The decreased band gap energy for treated Ni—Fe oxyhydroxide leads to higher conductivity due to more narrow electronic bands. In other words, reduction treatment of the electrode by $NaBH_4$ leads to less electrical resistance values which are also confirmed by electrical impedance spectroscopy (EIS). FIG. 6f demonstrates the Nyquist plots for pristine and reduced OER electrodes for assessing the charge transfer process. The semi-circle curve of the obtained data reveals that the charge transfer resistance ($R_{ct}$) is decreased from 79 to 36 ohm after the reduction treatment, indicating a faster charge transport of the reduced electrode.

Figure 9:
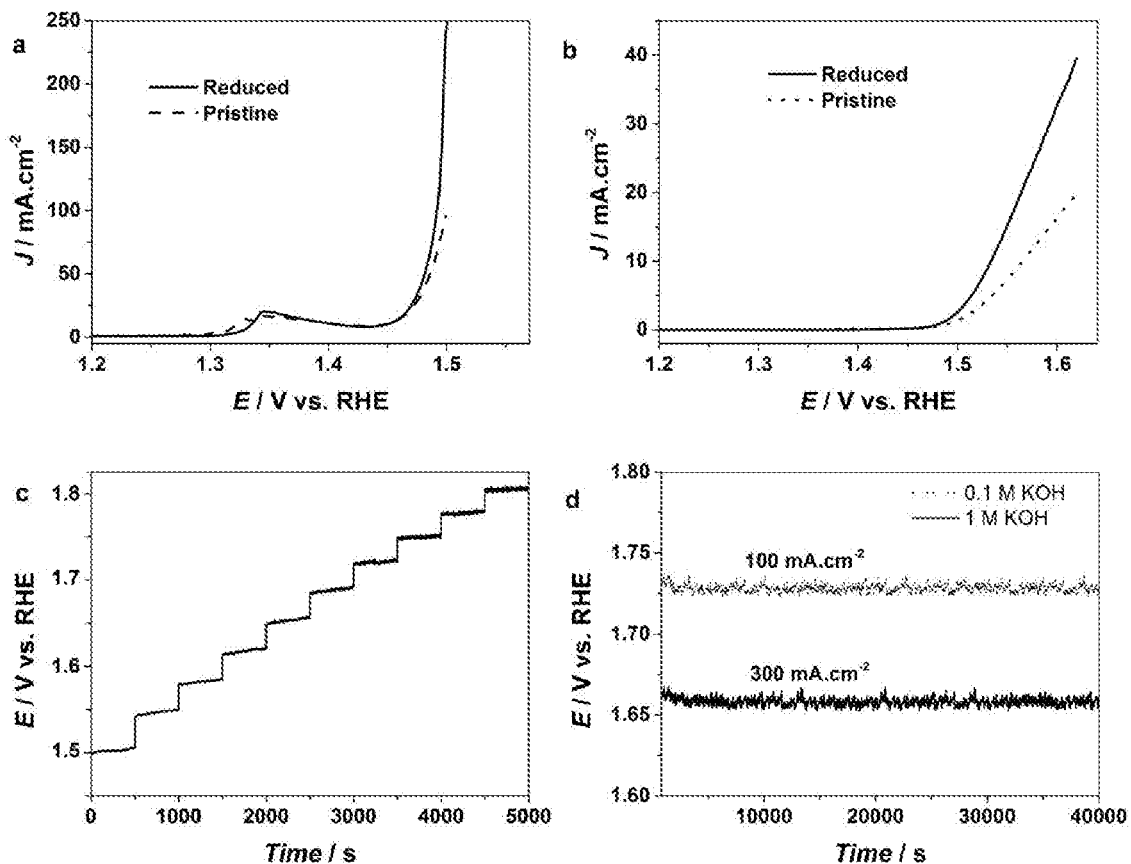
FIG. 9 shows at a,b) OER polarization curves of oxygen electrode, before and after $NaBH_4$ treatment in 1 M KOH at scan rate of 5 $mV·S^{-1}$ with 95% iR-compensation of; a) NiFe/NF electrode, b) NiFe/GC electrode, c) multi-step current process obtained for the R—NiFe/NF electrode in 1M KOH. The current density started at 100 $mA·cm^{-2}$ and finished at 550 $mA·cm^{-2}$, d) chronopotentiometry of reduced NiFe/NF electrode in 0.1 and 1 M KOH.
Figure 10:
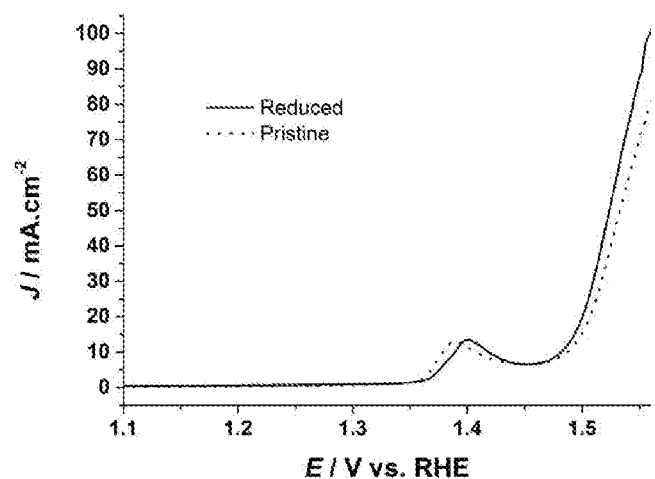
FIG. 10 shows linear sweep voltammograms of NiFe/NF electrodes in 0.1 M KOH at scan rate of 5 $mV·S^{-1}$ and 95% iR compensation.

The pristine and reduced electrodes were directly used as OER working electrode and tested in an alkaline media using a standard three electrodes electrochemical cell set-up with scan rate of 5 $mV·s^{-1}$. OER performances of reduced and pristine NiFe/NF electrodes in 1 and 0.1 M KOH are shown in FIGS. 9a and 10, respectively. The oxidation peak seen after 1.3 V (vs RHE) belongs to transformation between $Ni(OH)_2$ to NiOOH. Scanning to a higher anodic potential, a steady increase of oxygen evolution was accompanied by a significantly increased oxidation current for R—NiFe/NF electrode.

The onset potential of OER for both electrodes is similar, however, it is worth noting that an anodic shift of the $Ni^{2+}/Ni^{3+}$ wave was observed after reduction, indicating changes in the electronic structure. Although the details of this change are unknown, the effect of the electronic structure change on the catalytic activity is obvious, as a rapid rise of OER current is seen for R—NiFe/NF electrode at higher applied potentials. For comparison, at an overpotential of $\eta$=270 mV, the pristine and reduced electrode scan deliver a current density of 100 $mA·cm^{-2}$ and 240 $mA·cm^{-2}$ in 1 M KOH, respectively. This indicates that $NaBH_4$ treatment brings about enhanced OER current density of the electrode by more than two times. In 0.1 M KOH solution, similar behavior was detected and OER current density of 50 $mA·cm^{-2}$ was obtained at $\eta$=290 and 300 mV for reduced and pristine electrodes, respectively. Such increase in OER current without any marked change of onset potential indicates an improvement of NiFe/NF electrical conductivity where a narrowed band gap caused by the large concentration of OVs was obtained.

Figure 11:
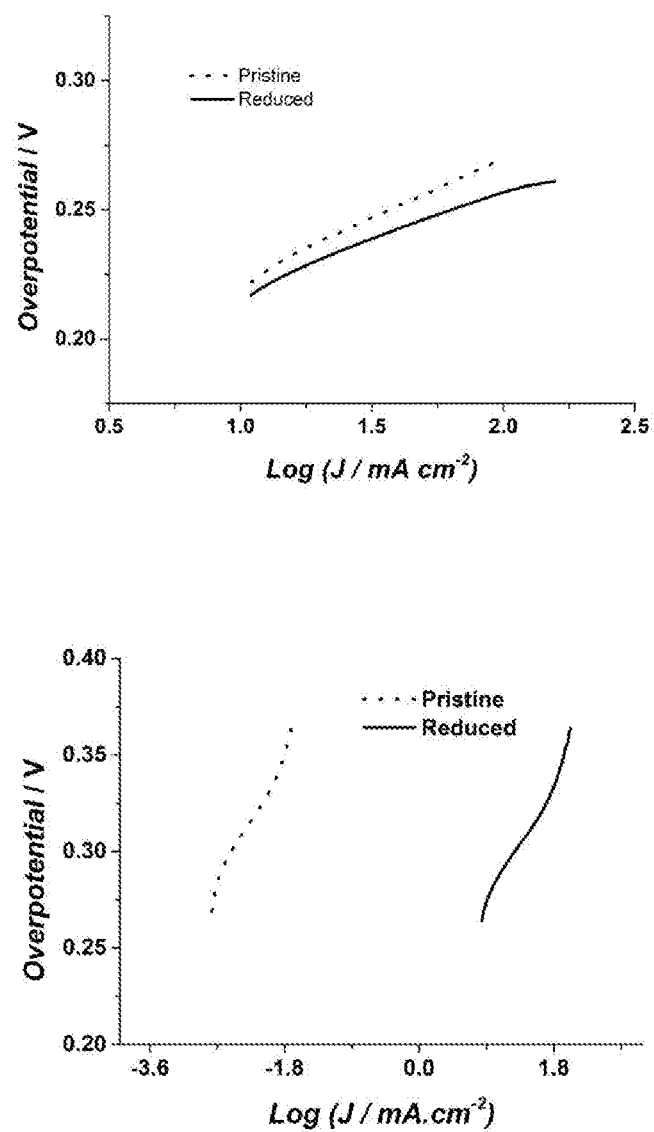
FIG. 11 shows Tafel slopes of NiFe/NF electrodes in a) 1 M and b) 0.1 M KOH
Figure 12:
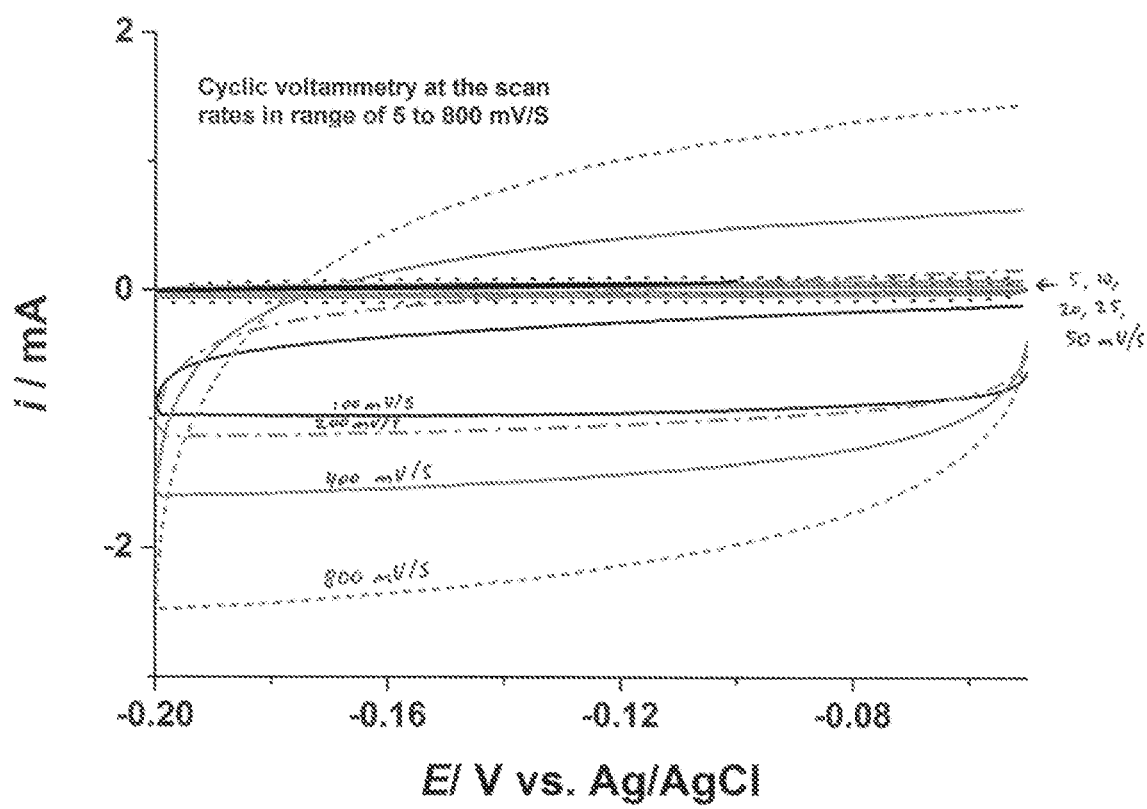
FIG. 12 shows double-layer capacitance measurements for determining ECSA of reduced NiFe/NF electrode in 1 M KOH, a) cyclic voltammetry in a non-Faradaic region of the voltammogram at scan rates of 0.005, 0.01, 0.02, 0.025, 0.05, 0.1, 0.2, 0.4, and 0.8 V/S. b) cathodic and anodic currents at −0.15 V vs. Ag/AgCl versus scan rate.
Figure 12:
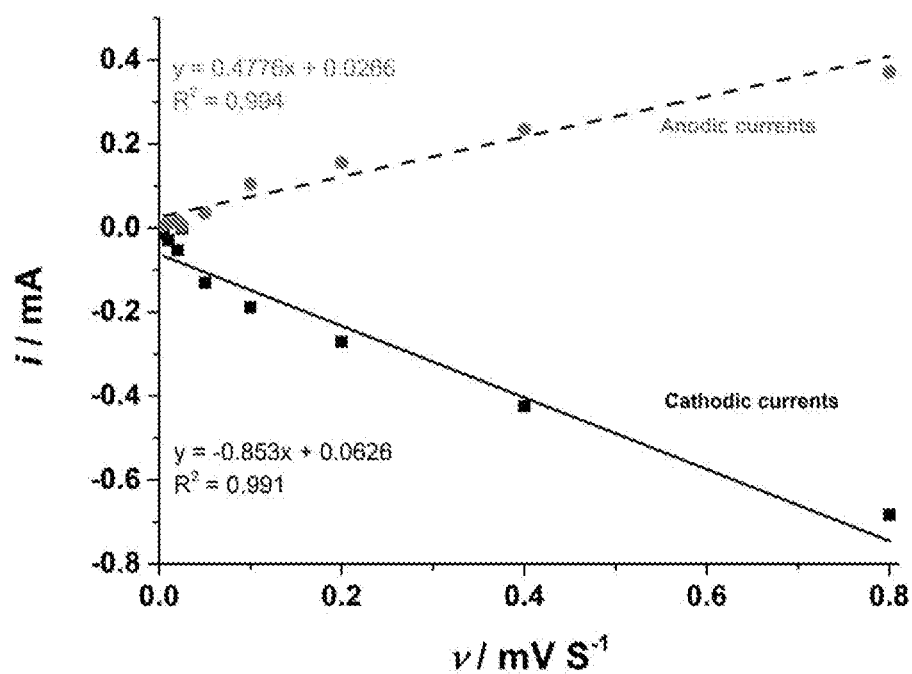
Figure 13:
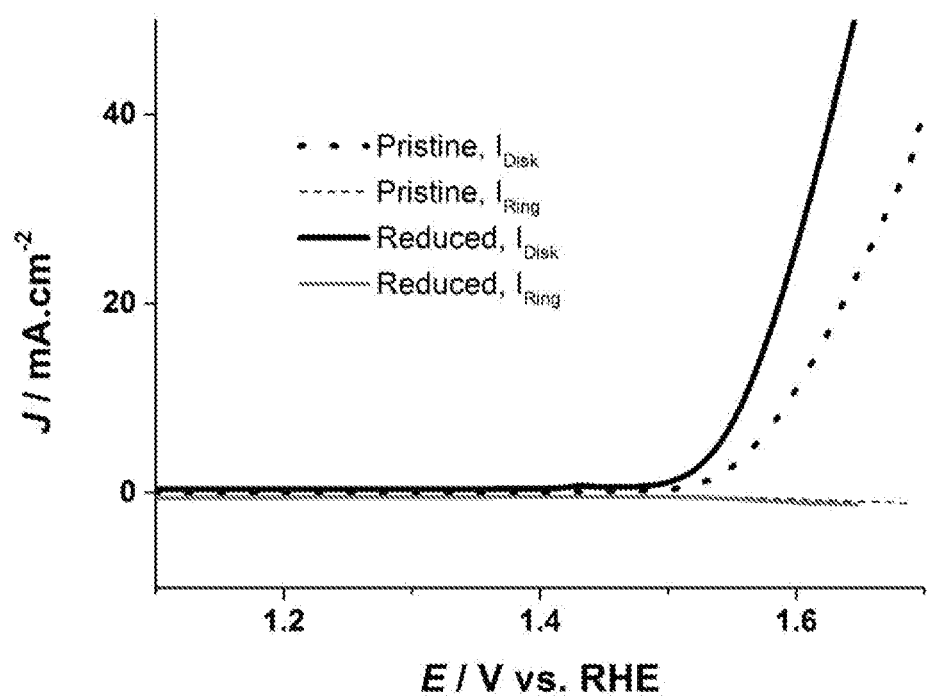
FIG. 13 shows experimental ring and disk currents for the pristine and R—NiFe/GC electrode on RRDE at 1600 rpm in Ar-saturated 1 M KOH.

Tafel slopes for the electrodes have also been evaluated. As shown in FIG. 11, the Tafel slope of pristine and reduced electrode is, respectively, 47 and 40 $mV·dec^{-1}$ in 1 M KOH, and 60 and 51 $mV·dec^{-1}$ in 0.1 M KOH, which are less than for $IrO_2$, $RuO_2$. This small Tafel slope for reduced electrode further demonstrates the more efficient kinetics of water oxidation with less polarization loss. Furthermore, the electrochemical surface area (ECSA) of R—NiFe/NF has been calculated and compared with the pristine electrode. The ECSA of each electrode is determined by double layer capacitance in 1 M KOH solution (FIG. 12). A roughness factor of 50 is determined for both pristine and reduced OER electrodes. This indicates that ECSA of reduced electrode has not changed after $NaBH_4$ treatment and the enhancement in OER activity is not caused by surface area increase. In addition, turnover frequency (TOF) of the NiFe catalyst at an overpotential of 400 mV increased from 0.075 for pristine catalyst to 0.146 $S^{-1}$ for R—NiFe. It should be also mentioned that the faradic efficiency remained relatively constant (97.0% and 97.7%) indicating that the current density originates from evolution of oxygen on the surface of the catalysts rather than other side reactions (FIG. 13).

Figure 14:
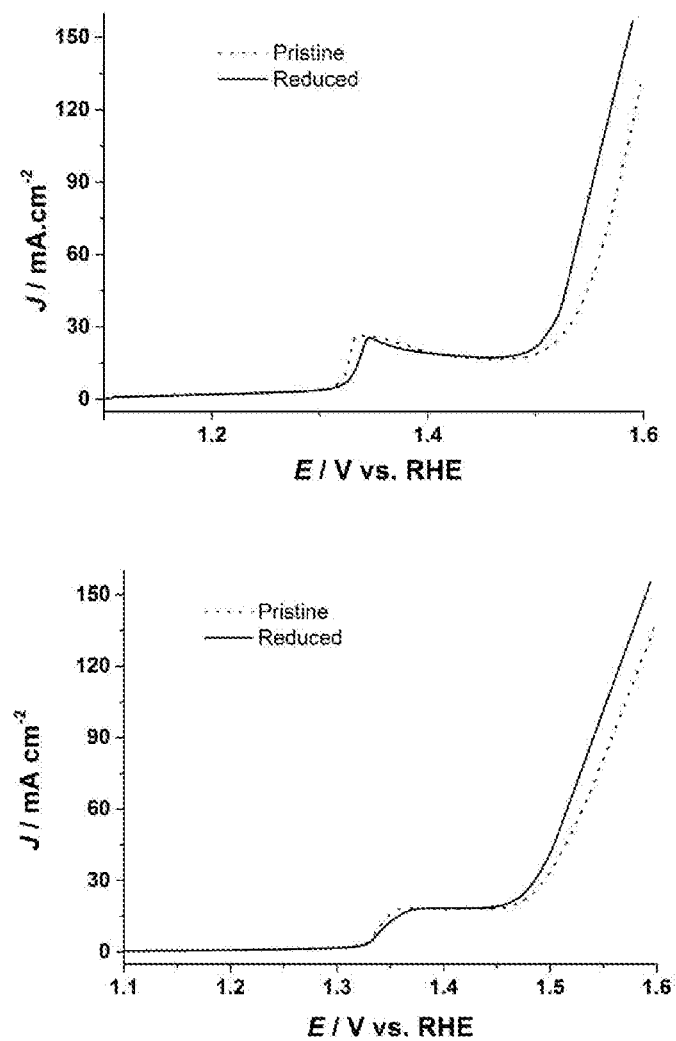
FIG. 14 shows linear sweep voltammograms at scan rate of 5 $mV·S^{-1}$ and 95% iR compensation of a) Ni/NF and b) Fe/NF in 1 M KOH.

The influence of $NaBH_4$ treatment on Ni/NF and Fe/NF electrodes was also investigated for comparison, with other conditions unchanged. FIG. 14 illustrates that dipping the electrodes into the $NaBH_4$ solution improved the Ni/NF and Fe/NF electrodes conductivity and, accordingly, their OER performance. However, this increase is not as much as for NiFe/NF. This result indicates that the treatment of a bimetallic composite (e.g. NiFe/NF) is more efficient than a unimetallic material (e.g. Ni/NF and Fe/NF). Without wishing to be bound by any particular theory, the inventors believe there is a synergetic effect in bimetallic composite materials, giving rise to a catalyst structure that is capable of achieving excellent OER performance (after exposure to the reducing agent).

Figure 15:
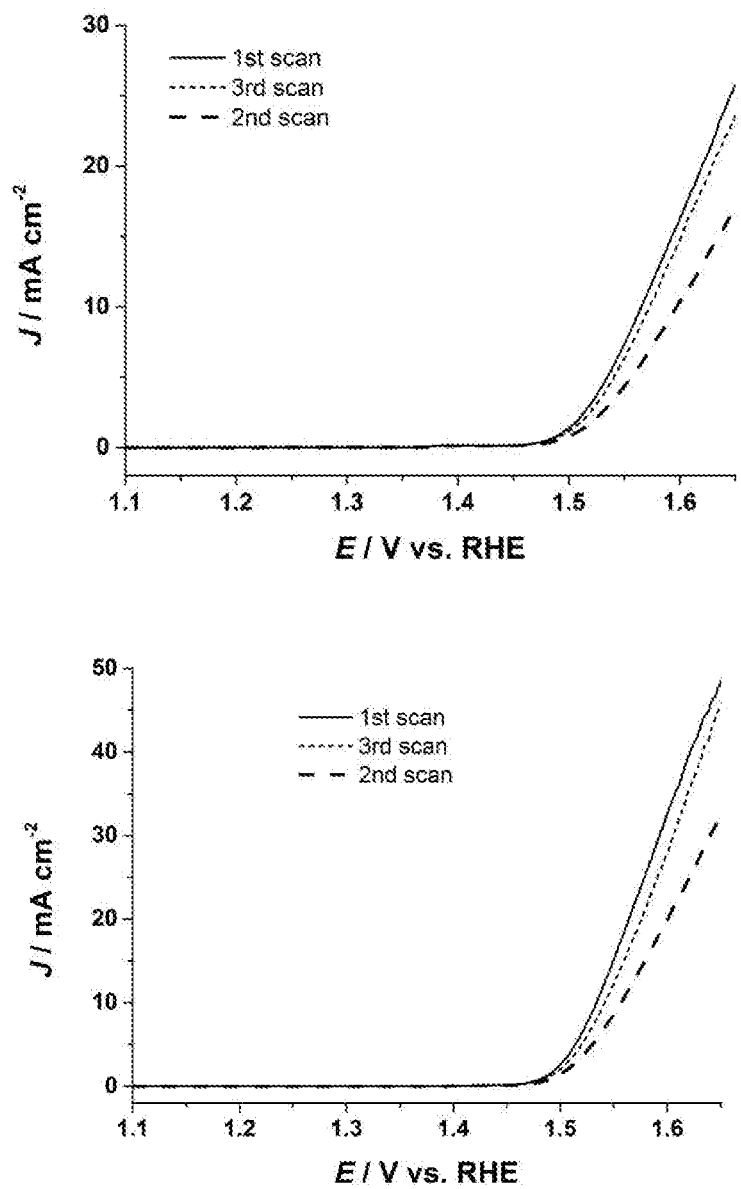
FIG. 15 shows linear sweep voltammograms at scan rate of 5 $mV·S^{-1}$ of a) pristine NiFe/NF and b) reduced NiFe/NF in 1 M KOH.

Since nickel foam (NF) coated with electrocatalyst can provide abundant active sites to be exposed to electrolytes, to confirm that the NaBH$_4$ treatment is related to active materials and not the substrate, Ni—Fe was first electrodeposited on glass carbon (GC) and then treated with NaBH$_4$. The three consequent OER polarization curves investigated for the pristine and reduced NiFe electrodeposited onto the planar GC electrode in 1 M KOH solution are shown in FIG. 15. It can be seen that the second polarization curve for both electrodes are significantly influenced by the gas bubbles generated on the first scan and consequently a significant decrease in the current occurs. However, when the bubbles attached on NiFe/GC electrode are removed, the catalytic activity of the NiFe/GC electrodes is recovered (third scan). FIG. 9b shows the same effectiveness of NaBH$_4$ treatment for NiFe/GC electrode.

Figure 16:
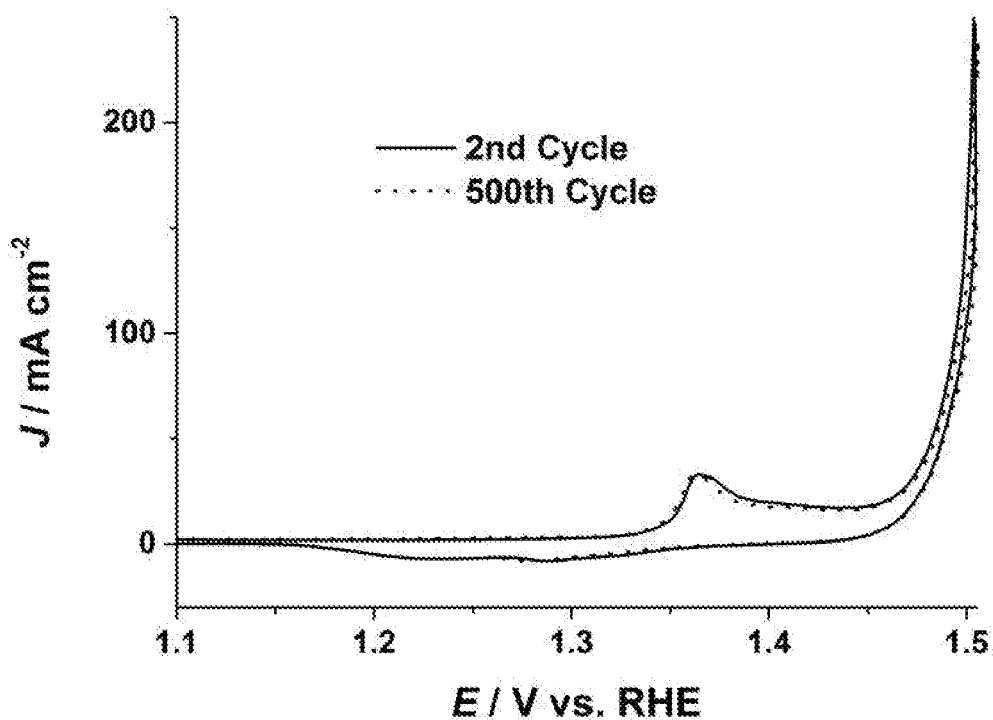
FIG. 16 shows cyclic voltammetric curves obtained with the R—NiFe/NF electrode in 1 M KOH at scan rate of 5 $mV·S^{-1}$ with 95% iR-compensation.
Figure 17:
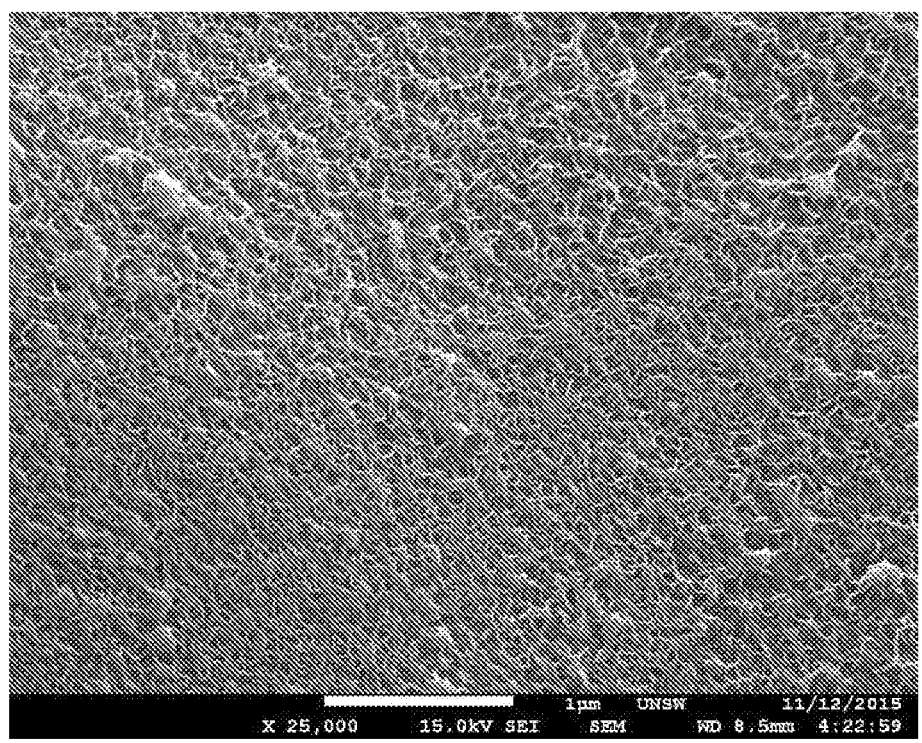
FIG. 17 shows SEM images of R—NiFe/NF electrode after an extended period utilised in OER condition.

FIG. 9c exhibits a multi-step chronopotentiometric curve for R—NiFe/NF in 1M KOH. In the experiment, the current is increased from 100 to 550 mA·cm$^{-2}$ in increments of 50 mA cm$^{-2}$ every 500 s, and the corresponding changes of potential are recorded. At the start of the experiment, the potential reaches 1.5 V gradually. In the next step by rising current density to 150 mA·cm$^{-2}$ the potential blooms at 1.55 V and remains constant for the remaining 500 s. Similar behavior is seen for all current densities up to 550 mA·cm$^{-2}$ during the test. Such linear response of potential by current density variation reflects the excellent mass transport properties (outwards diffusion of oxygen bubbles and inward diffusion of hydroxide ions), conductivity as well as mechanical robustness of the reduced NiFe/NF electrode. In order to examine the electrode electrochemical stability, long time chronopotentiometry and cyclic voltammetry (CV) in 0.1 and 1 M KOH for NaBH$_4$-treated 3D electrode was performed. The potential changes of the electrode are negligible with very small voltage fluctuations even after 10 hours (FIG. 9d) which was evidenced by 500 cycle of CV in FIG. 16 with no change in the catalyst morphology (FIG. 17). Such observations indicate good durability of oxygen vacancies in the NiFe—OOH structure and strong binding between the reduced NiFe—OOH nanosheets and the substrate under OER condition.

Figure 18:
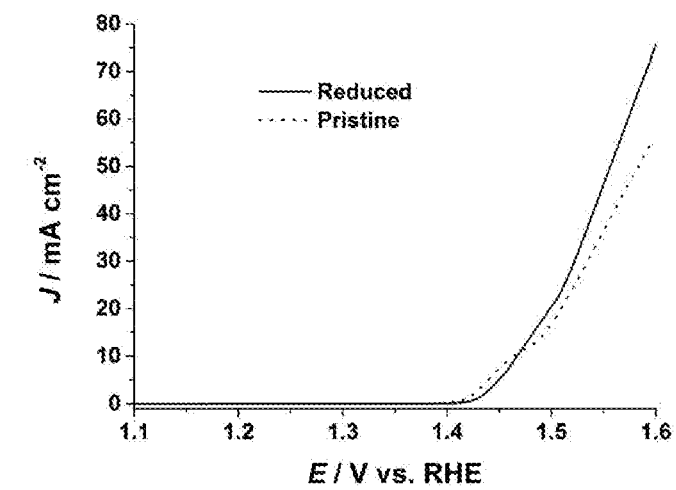
FIG. 18 shows a) OER polarization curves of Ni—Fe Layered Double Hydroxide/CNT and b) NiFe/NF synthesized by hydrothermal method before and after $NaBH_4$ treatment in 1 M KOH at scan rate of 5 $mV·S^{-1}$ with 95% iR-compensation.
Figure 18:
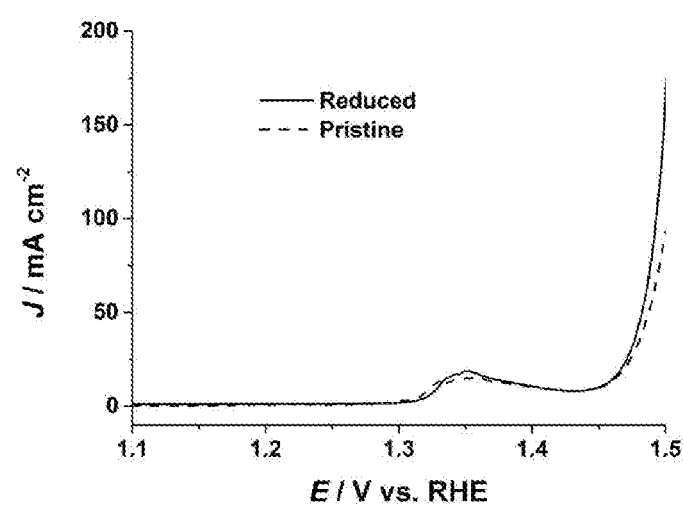

Notably, the NaBH$_4$ reduction process was found useful for other OER catalysts made from different materials and methods. For instance, the effect of the reduction treatment on NiFe-LDH with carbon nano tube (CNT) support and on NiFe/NF synthesized by hydrothermal method has been investigated and significant enhancement of OER activity observed (FIG. 18).

These examples demonstrate that exposing the metallic composite coating to a reducing agent (e.g. NaBH$_4$ treatment) can be a fast and simple method to increase the OER electrocatalytic activity of metal hydroxide based catalysts by reduction of species on the surface of catalyst. The treatment creates some defects, in particular, oxygen vacancies, in the metal hydroxide catalyst structure and accordingly narrows the band gap energy, resulting in electrical conductivity enhancement of the materials.

The inventors have found that introducing oxygen vacancy (OV) in R—NiFe/NF nanosheets improves its donor density, active sites and even decrease the energy required for H$_2$O adsorption, thus enhancing the OER performance of R—NiFe/NF nanosheets. In addition, the direct chemical treatment of the Ni—Fe film on nickel foam as a 3D substrate not only provide it large surface area, fast charge transport pathways and improved contact resistance, but it also produces binder-free electrode for water-splitting or advanced metal-air battery devices. Using the reduced electrode, in accordance with the present invention, as an anode, a surprisingly high OER activity (on R—NiFe/NF), which outperforms all the Ni—Fe based materials in alkaline previously reported, was observed.

It is to be understood that, if any prior art publication is referred to herein; such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for improving the catalytic activity of an oxygen evolution reaction (OER) catalyst, the OER catalyst comprising a porous substrate with a porous catalytic metallic composite coating, the method comprising:
   exposing the porous metallic composite coating to a reducing agent in solution at a temperature of between 10° C. and 50° C., wherein the porous metallic composite coating is a nickel-iron composite; and
   reducing the nickel-iron composite upon the exposing of the porous metallic composite coating to the reducing agent so as to form a reduced nickel-iron composite having an increased oxygen vacancy density in the reduced nickel-iron composite as compared to the nickel-iron composite.

2. The method according to claim 1, wherein the nickel-iron composite comprises a nickel-iron oxide, a nickel-iron hydroxide, or a mixture thereof.

3. The method according to claim 1, wherein the nickel-iron composite has a formula of Ni$_{2x}$Fe$_{3y}$(OH)$_{2x+3y}$, wherein x is a number between about 0.1 and about 2 and y is a number between about 0.1 and about 2.

4. The method according to claim 1, wherein the metallic composite coating is amorphous.

5. The method according to claim 4, wherein the amorphous metallic composite coating comprises nanosheets, nanoflakes, or a combination thereof.

6. The method according to claim 1, wherein the metallic composite coating is crystalline.

7. The method according to claim 1, wherein the reducing agent is sodium borohydride (NaBH$_4$).

8. The method according to claim 1, wherein the substrate is an electrically conductive substrate.

9. The method according to claim 8, wherein the electrically conductive substrate is nickel foam.

* * * * *